(12) United States Patent
Amdahl et al.

(10) Patent No.: US 8,121,117 B1
(45) Date of Patent: Feb. 21, 2012

(54) APPLICATION LAYER NETWORK TRAFFIC PRIORITIZATION

(75) Inventors: Saxon Amdahl, Mountain View, CA (US); Robert Lennie, San Jose, CA (US); Richard Larson, San Jose, CA (US)

(73) Assignee: F5 Networks, Inc., Seattle, WA (US)

( * ) Notice: Subject to any disclaimer, the term of this patent is extended or adjusted under 35 U.S.C. 154(b) by 128 days.

(21) Appl. No.: 12/209,968

(22) Filed: Sep. 12, 2008

Related U.S. Application Data (60) Provisional application No. 60/976,645, filed on Oct. 1, 2007.

(51) Int. Cl.
H04L 12/28 (2006.01)
H04L 12/56 (2006.01)
H04L 12/26 (2006.01)
H04L 12/16 (2006.01)
H04L 1/00 (2006.01)
G06F 15/173 (2006.01)

(52) U.S. Cl. ..... 370/389; 370/351; 370/229; 370/230.1; 370/235; 709/238; 709/240

(58) Field of Classification Search .......... 370/229–240, 370/351, 352, 360, 389; 709/227, 228, 238, 709/240, 242

See application file for complete search history.

(56) References Cited

U.S. PATENT DOCUMENTS

| | | | |
|---|---|---|---|
| 5,623,490 A | 4/1997 | Richter et al. | |
| 5,991,302 A | 11/1999 | Berl et al. | |
| 5,995,491 A | 11/1999 | Richter et al. | |
| 6,104,706 A | 8/2000 | Richter et al. | |
| 6,466,580 B1 | 10/2002 | Leung | |
| 6,469,983 B2 | 10/2002 | Narayana et al. | |
| 6,560,230 B1 | 5/2003 | Li et al. | |
| 6,654,346 B1 | 11/2003 | Mahalingaiah et al. | |
| 6,728,265 B1 | 4/2004 | Yavatkar et al. | |
| 6,738,357 B1 | 5/2004 | Richter et al. | |
| 6,744,776 B1 | 6/2004 | Kalkunte et al. | |
| 6,754,215 B1 | 6/2004 | Arikawa et al. | |
| 6,760,337 B1 | 7/2004 | Snyder, II et al. | |
| 6,880,017 B1 | 4/2005 | Marce et al. | |
| 6,914,881 B1 | 7/2005 | Mansfield et al. | |

(Continued)

FOREIGN PATENT DOCUMENTS

| | | |
|---|---|---|
| CA | 2080530 A1 | 4/1994 |
| EP | 0605088 A2 | 6/1994 |
| EP | 0605088 A3 | 2/1996 |

(Continued)

OTHER PUBLICATIONS

Padmanabhan, "Using Predictive Prefething to Improve World Wide Web Latency", '96, SIGCOM, all pages. (1-15).*

(Continued)

Primary Examiner — Kwang B Yao
Assistant Examiner — Adam Duda
(74) Attorney, Agent, or Firm — LeClairRyan, a Professional Corporation (57) ABSTRACT

Layer-7 application layer message ("message") classification is disclosed. A network traffic management device ("NTMD") receives incoming messages over a first TCP/IP connection from a first network for transmission to a second network. Before transmitting the incoming messages onto the second network, however, the NTMD classifies the incoming messages according to some criteria, such as by assigning one or more priorities to the messages. The NTMD transmits the classified messages in the order of their message classification. Where the classification is priority based, first priority messages are transmitted over second priority messages, and so forth, for example.

21 Claims, 5 Drawing Sheets

U.S. PATENT DOCUMENTS

| | | |
|---|---|---|
| 6,975,592 B1 | 12/2005 | Seddigh et al. |
| 6,990,114 B1 | 1/2006 | Erimli et al. |
| 7,039,061 B2 | 5/2006 | Connor et al. |
| 7,075,924 B2 | 7/2006 | Richter et al. |
| 7,236,491 B2 | 6/2007 | Tsao et al. |
| 2001/0007560 A1* | 7/2001 | Masuda et al. ............... 370/401 |
| 2002/0194342 A1* | 12/2002 | Lu et al. .................... 709/227 |
| 2003/0128708 A1 | 7/2003 | Inoue et al. |
| 2003/0156586 A1 | 8/2003 | Lee et al. |
| 2003/0179755 A1 | 9/2003 | Fraser |
| 2004/0017825 A1 | 1/2004 | Stanwood et al. |
| 2004/0213156 A1 | 10/2004 | Smallwood et al. |
| 2005/0117589 A1 | 6/2005 | Douady et al. |
| 2005/0175013 A1 | 8/2005 | Le Pennec et al. |
| 2005/0213587 A1 | 9/2005 | Cho et al. |
| 2006/0031374 A1 | 2/2006 | Lu et al. |
| 2006/0045096 A1 | 3/2006 | Farmer et al. |
| 2006/0140193 A1 | 6/2006 | Kakani et al. |
| 2006/0153201 A1 | 7/2006 | Hepper et al. |
| 2006/0268692 A1 | 11/2006 | Wright et al. |

FOREIGN PATENT DOCUMENTS

| | | |
|---|---|---|
| JP | 6205006 A | 7/1994 |
| JP | 821924 B2 | 3/1996 |
| JP | 2000-183935 A | 6/2000 |
| WO | WO0239696 A2 | 5/2002 |
| WO | WO2006091040 A1 | 8/2006 |

OTHER PUBLICATIONS

Gupta et al., "Algorithms for Packet Classification," Dept. of Comput. Sci., Stanford Univ., CA 15(2):24-32 (Mar./Apr. 2001) (Abstract only).

Heinz, "Priorities in Stream Transmission Control Protocol (SCTP) Multistreaming," Thesis submitted to the Faculty of the University of Delaware (Spring 2003).

Ilvesmaki et al., "On the Capabilities of Application Level Traffic Measurements to Differentiate and Classify Internet Traffic," Presented in SPIE's International Symposium ITCom, Denver Colorado USA (Aug. 19-21, 2001).

Modiano, "Scheduling Algorithms for Message Transmission Over a Satellitebroadcast System," MILCOM 97 Proceedings Lincoln Lab., MIT, Lexington, MA 2(2):628-34 (Nov. 2-5, 1997) (Abstract only).

Ott & Mayer-Patel, "A Mechanism for TCP-Friendly Transport-level Protocol Coordination," USENIX Annual Technical Conference (2002).

Wang, "Priority and Realtime Data Transfer Over the Best-Effort Internet," Dissertation Abstract (2005).

Woo, "A Modular Approach to Packet Classification: Algorithms and Results," Nineteenth Annual Conference of the IEEE Computer and Communications Societies 3(3)1213-22 (Mar. 26-30, 2000).

Internet Protocol, "Darpa Internet Program Protocol Specification," (RFC:791) at http://www.ietf.org/rfc/rfc791.txt, by Information Sciences Institute University of Southern California, Marina del Rey, CA, for Defense Advanced Research Projects Agency Information Processing Techniques Office, Arlington, VA, pp. 1-49 (Sep. 1981).

Nichols, et al., "Definition of the Differentiated Services Field (DS Field) in the IPv4 and IPv6 Headers," (RFC:2474) at http://www.ietf.org/rfc/rfc2474.txt, pp. 1-19 (Dec. 1998).

Rosen, et al., "MPLS Label Stack Encoding," (RFC:3032) at http://www.ietf.org/rfc/rfc3032.txt, pp. 1-22 (Jan. 2001).

* cited by examiner

APPLICATION LAYER NETWORK TRAFFIC PRIORITIZATION

This application claims the benefit of U.S. Provisional Patent Application Ser. No. 60/976,645 filed Oct. 1, 2007, which is hereby incorporated by reference in its entirety.

TECHNICAL FIELD

The technology relates generally to network communications and, more particularly, to prioritizing network traffic at the Layer-7 application layer.

BACKGROUND

The enormous growth in network communications has been due in part to software applications' increased abilities to interact with each other across Wide Area Networks ("WANs"). The transmission of large amounts of data across WANs, however, creates special challenges for achieving a high degree of application and network performance. To fully appreciate the extent of these challenges, a brief primer on basic network concepts will now be provided for background purposes, beginning with a discussion on the Open Systems Interconnection ("OSI") conceptual network model.

The OSI model is commonly used to define the flow of data, or "network traffic," over a network between network applications and/or devices. The OSI model has seven layers including the application layer ("Layer-7"), the presentation layer ("Layer-6"), the session layer ("Layer-5"), the transport layer ("Layer-4"), the network layer ("Layer-3"), the data link layer ("Layer-2"), and the physical layer ("Layer-1"). Each OSI layer communicates with a layer above and/or below it and with corresponding layer(s) on other applications and/or devices in the network through specific protocols. The network layers are often referred to as "the network stack," and the most common protocols in which these layers are implemented are the TCP/IP protocols.

The TCP portion of the protocol corresponds to the Layer-4 transport layer in the OSI model. The IP portion of the protocol defines standards for data packets that may comprise data message(s) at the Layer-7 application layer. The TCP/IP protocols ensure the reliable, in order delivery of data. For instance, an application on a first device (e.g., client) may request that data be sent to another application at a second device (e.g., server).

The client's TCP/IP stack, typically implemented in the operating system kernel, may eventually partition the data into Layer-7 application layer messages to be transmitted over a Layer-1 physical connection. The data transmitted is typically acknowledged as it is received in a specified order, and lack of an acknowledgement from its intended recipient often results in portions of the data being resent. When portions of data are received out of sequence, however, the TCP/IP regime nevertheless requires waiting for the remaining portions of data before any processing can be performed by the recipient upon the data, a condition known as "head of line blocking."

The growing complexity and sophistication of more elegant network application solutions recently, however, have been increasingly frustrated by the rigidity of the TCP/IP approach. For instance, while the TCP/IP protocols ensure the reliable, in order delivery of data, they do not recognize acceptable exceptions for violating the in order delivery of data maxim. As network applications become ever more sophisticated, the ability to send data out of order may help overcome TCP/IP's limitations and sustain their continued growth.

SUMMARY

Broadly stated, application layer message classification techniques are disclosed, which at a high-level may involve classifying otherwise unclassified incoming Layer-7 application layer messages ("messages") in network bound traffic, received by a network traffic management device through a first TCP/IP connection, according to some criteria. The network traffic management device may transmit the classified messages pertaining to selected message classifications ahead of other classified messages pertaining to unselected classifications through one of the several second TCP/IP connections.

Further, the messages may be classified independent of any packet-level prioritization information included in the data packets forming the messages. Furthermore, the criteria upon which the messages may be classified to create the different message classifications may include prioritization, such as prioritizing certain messages ahead of others based on one or more message characteristics, although the messages could be prioritized based on any number of other factors, such as network conditions, message content, and the like.

BRIEF DESCRIPTION OF THE DRAWINGS

The same reference numerals and/or other reference designations employed throughout the ensuing drawings are used to identify identical components, except as provided otherwise.

DETAILED DESCRIPTION

Figure 1:
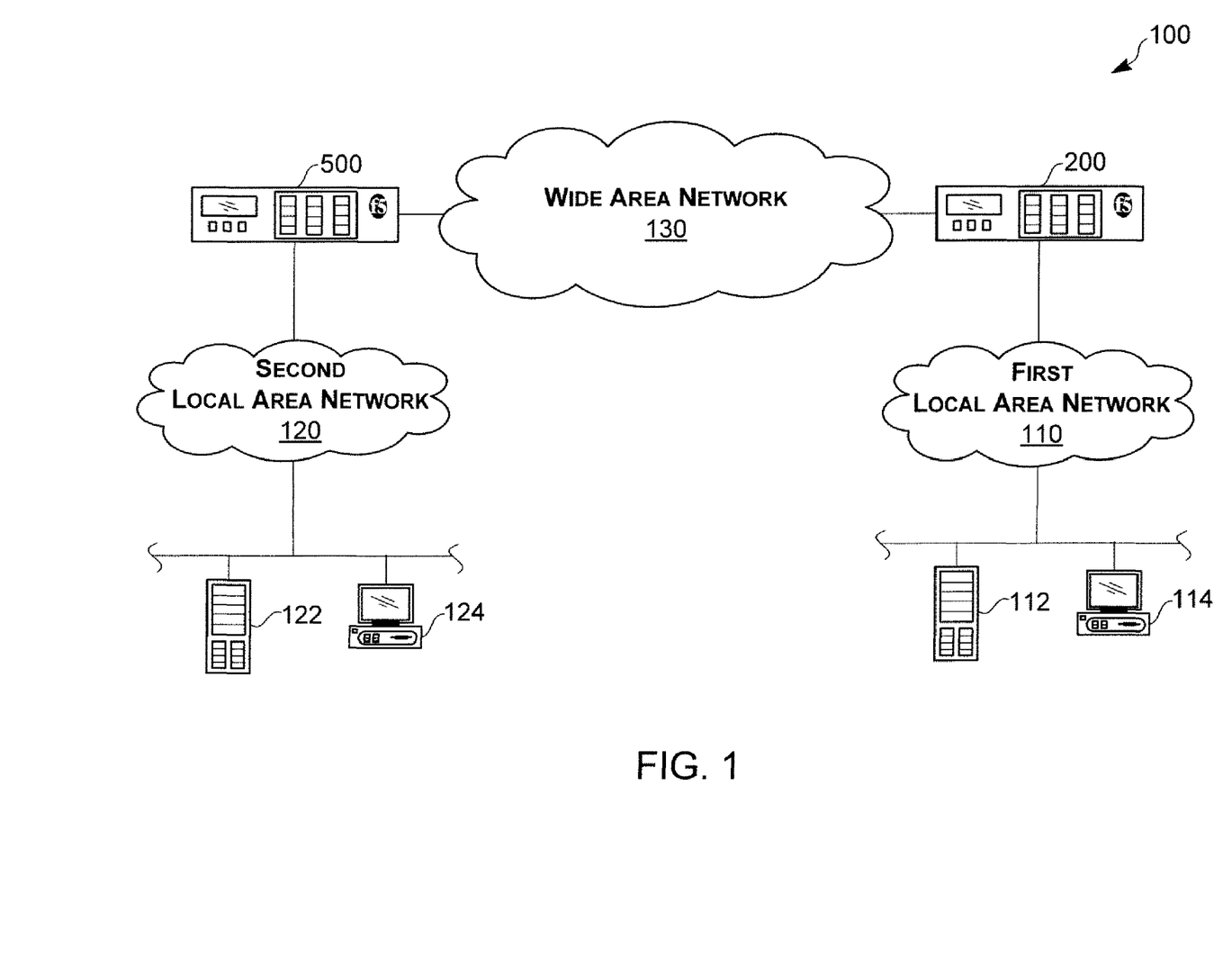
FIG. 1 is a diagram of an example message prioritization system environment.
Figure 2:
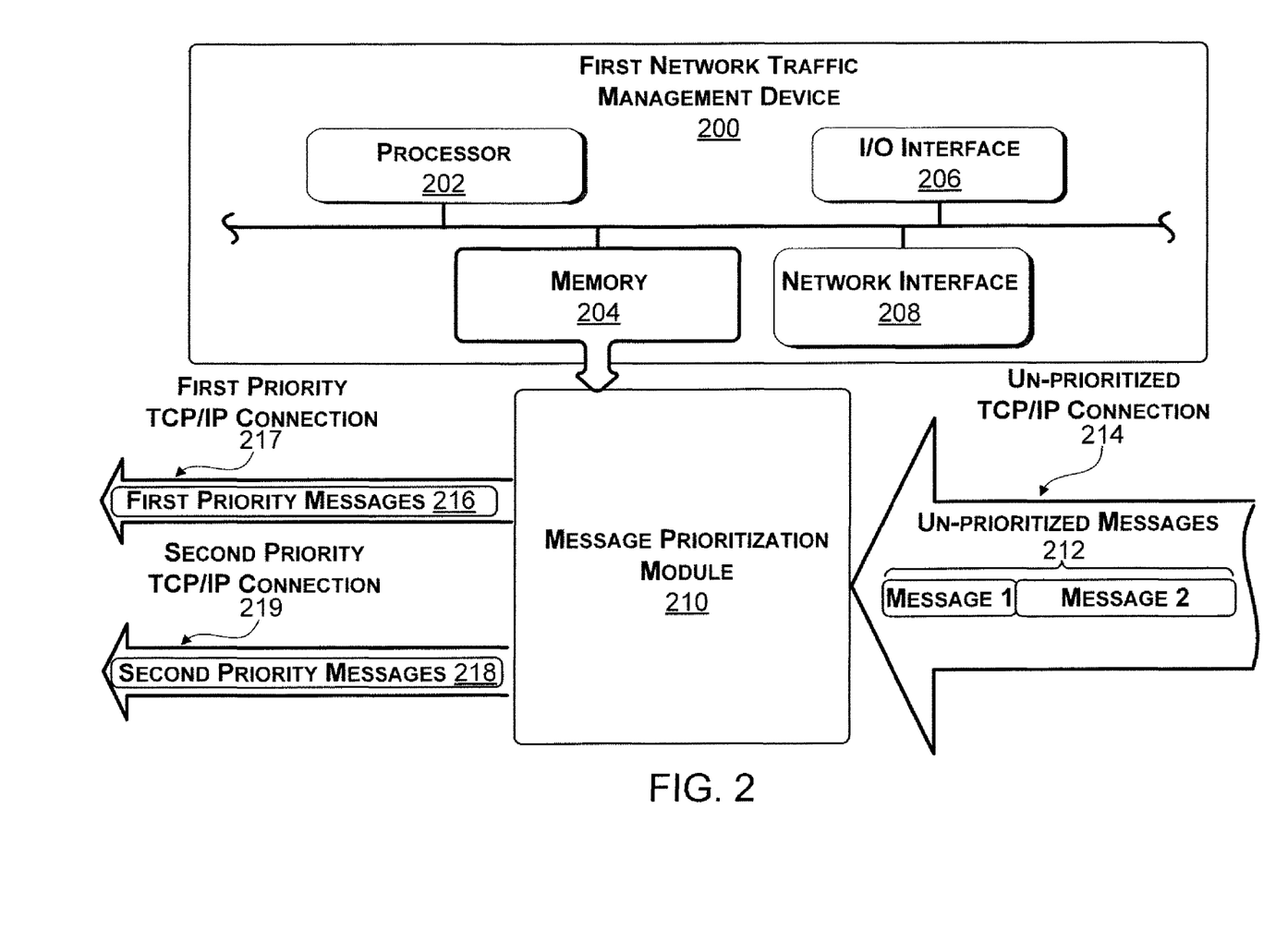
FIG. 2 is a diagram of an example network management device that implements a message prioritization module that may be used in the message prioritization system environment shown in FIG. 1.

Referring to FIGS. 1 and 2, a simplified example message prioritization system environment 100 is shown. Generally, at least one of the first and second network traffic management devices 200, 500 shown in FIG. 1 may employ a message prioritization module 210 that receives un-prioritized messages 212 through an un-prioritized TCP/IP connection 214 to be prioritized and transmitted as first and second priority messages 216, 218 through first and second priority TCP/IP connections 217, 219, respectively, onto a wide area network ("WAN") 130. The message prioritization system environment 100 enables prioritizing application-layer messages and sending messages out of order without incurring head of line blocking problems, among other potential benefits.

Referring now specifically to FIG. 1, the example message prioritization system environment 100 may include a first local area network ("LAN") 110 in communication with a second LAN 120 over WAN 130, although other network environments could be used.

First LAN 110 may include one or more first server devices 112, one or more first client devices 114, and one or more first network traffic management devices 200, although the LAN 110 may also include one or more additional intermediary network devices in communication with each other via one or more wired and/or wireless network links, such as switches, routers, modems, or gateways (not shown), and the like, as well as other types of network devices including network storage devices.

Furthermore, the various devices in the first LAN 110 (e.g., first server device 112, first client device 114) may communicate and interact with other devices in second LAN 120 (e.g., second server device 122, second client device 124) over WAN 130 via the first network traffic management device 200. In other words, the first network traffic management device 200 may be said to sit "at the edge" of the first LAN 110. That way, all or portions of in-bound and/or out-bound network traffic to/from the devices in LAN 110 may pass through the first traffic management device 200 onto WAN 130 eventually to the devices in LAN 120 through the second traffic management device 500. However, if one of network management devices 200, 500 is not present in either the first and second LANs 110, 120, respectively, then the LAN 120, 130 devices may communicate over the WAN 130 directly as they would in any conventional network environment absent one of the devices 200, 500.

As will be described in greater detail herein, the devices in at least one of the first and second LANs 110, 120 (i.e., first and second clients 114, 124; first and second servers 112, 122) may send network bound un-prioritized message level network traffic through at least one of network traffic management devices 200, 500, respectively, which in turn may prioritize and send the prioritized messages over the WAN 130. In the example in FIG. 1, improved communication may result between first LAN 110 and second LAN 120.

Second LAN 120 is identical to first LAN 110 in this example, except LAN 120 instead includes second server devices 122 and second client devices 124, although LAN 120 may include a fewer or greater number of the same or different devices (e.g., network devices, network storage devices, etc.).

It should be noted that in the example message prioritization system environment 100 shown in FIG. 1, one of the first or second network management devices 200, 500 alternatively may not be present. If both the first or second network management devices 200, 500 are utilized in the environment 100, however, it should also be noted that just one of the devices could implement the message prioritization module 210 shown in FIG. 2, although both devices could certainly implement the module 210.

Finally, each of the first LAN 110, second LAN 120 and WAN 130 illustrated in FIG. 1 may comprise any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

Referring specifically to FIG. 2, the first network management device 200 may include processor 202, memory 204, I/O interface 206, and network interface 208, all or some of which may be communicatively interconnected via one or more buses and/or other communication links, although the first network management device 200 may include a fewer or greater number of the same or different components.

Processor 202 may include one or more microprocessors configured to execute one or more machine readable and executable instructions stored in memory 204 to implement network traffic related management functions of the first traffic management device 200 in addition to prioritizing messages as described herein in connection with FIGS. 2-5, although processor 202 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like, programmed or configured according to the teachings as described and illustrated herein with respect to FIGS. 2-5.

Figure 3:
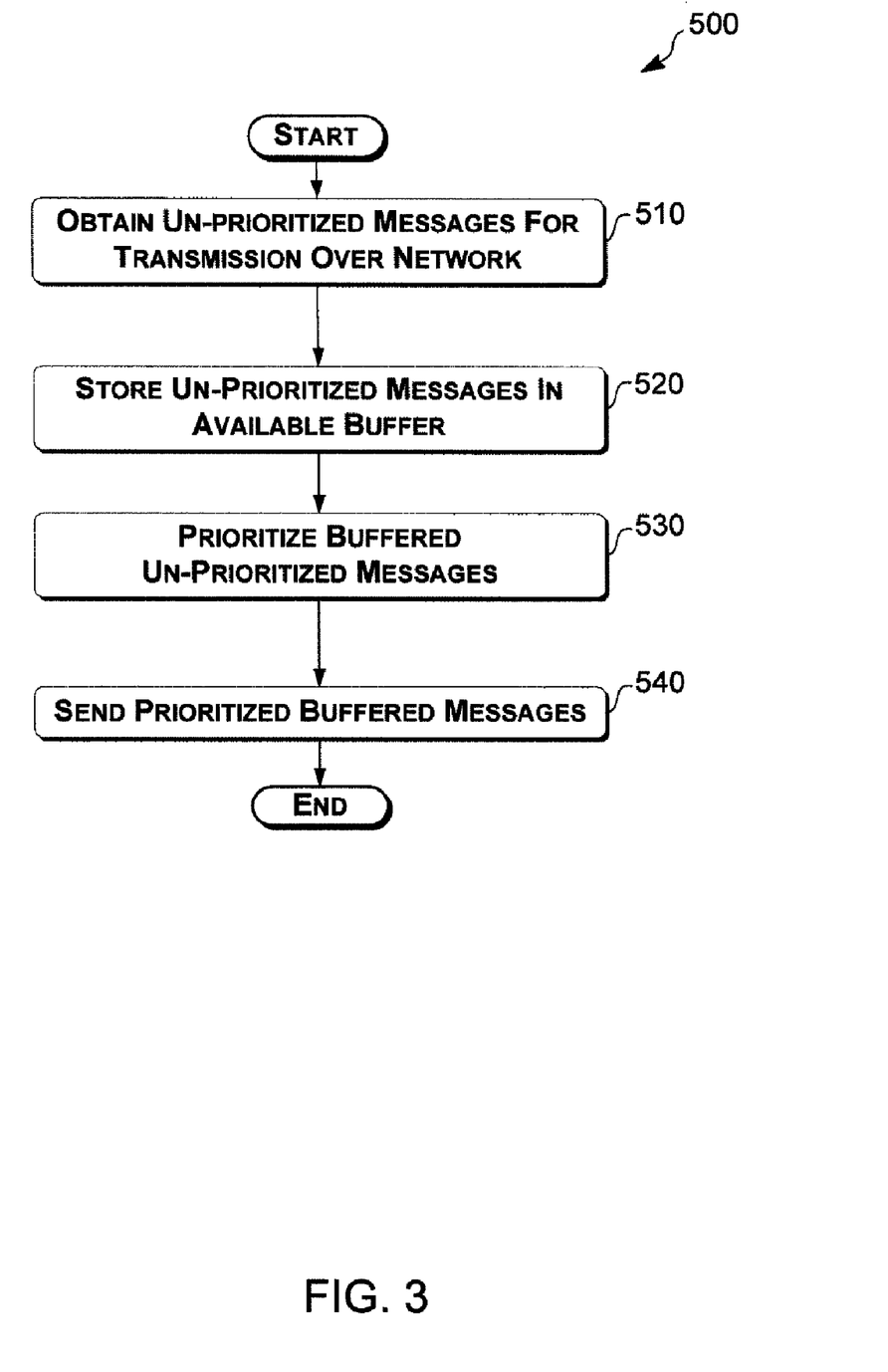
FIG. 3 is a flow chart of a message prioritization process that may be performed by at least one of the network management devices shown in FIG. 1.
Figure 4:
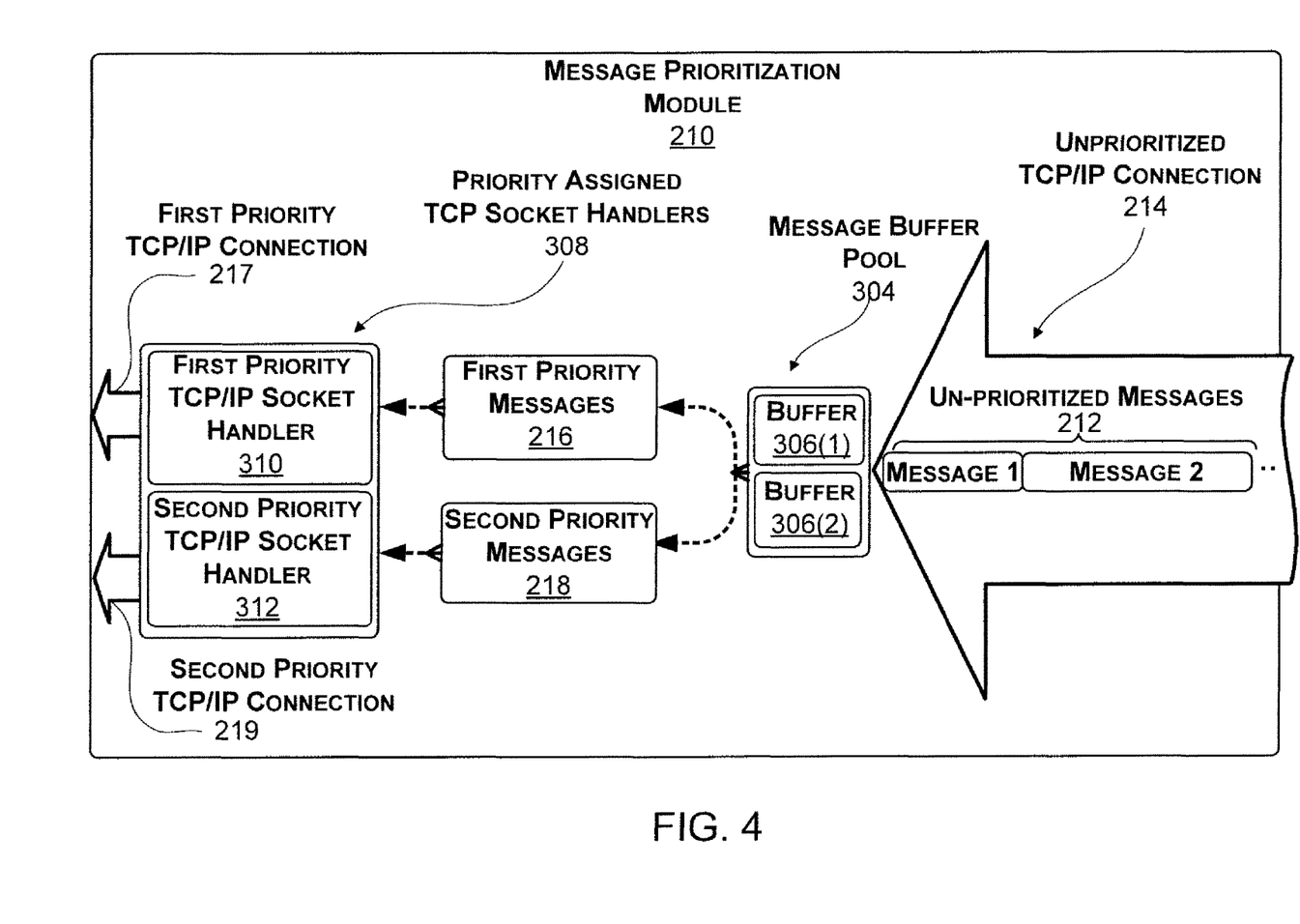
FIG. 4 is a functional block diagram of an example message prioritization module from FIG. 2 that may be implemented.
Figure 5:
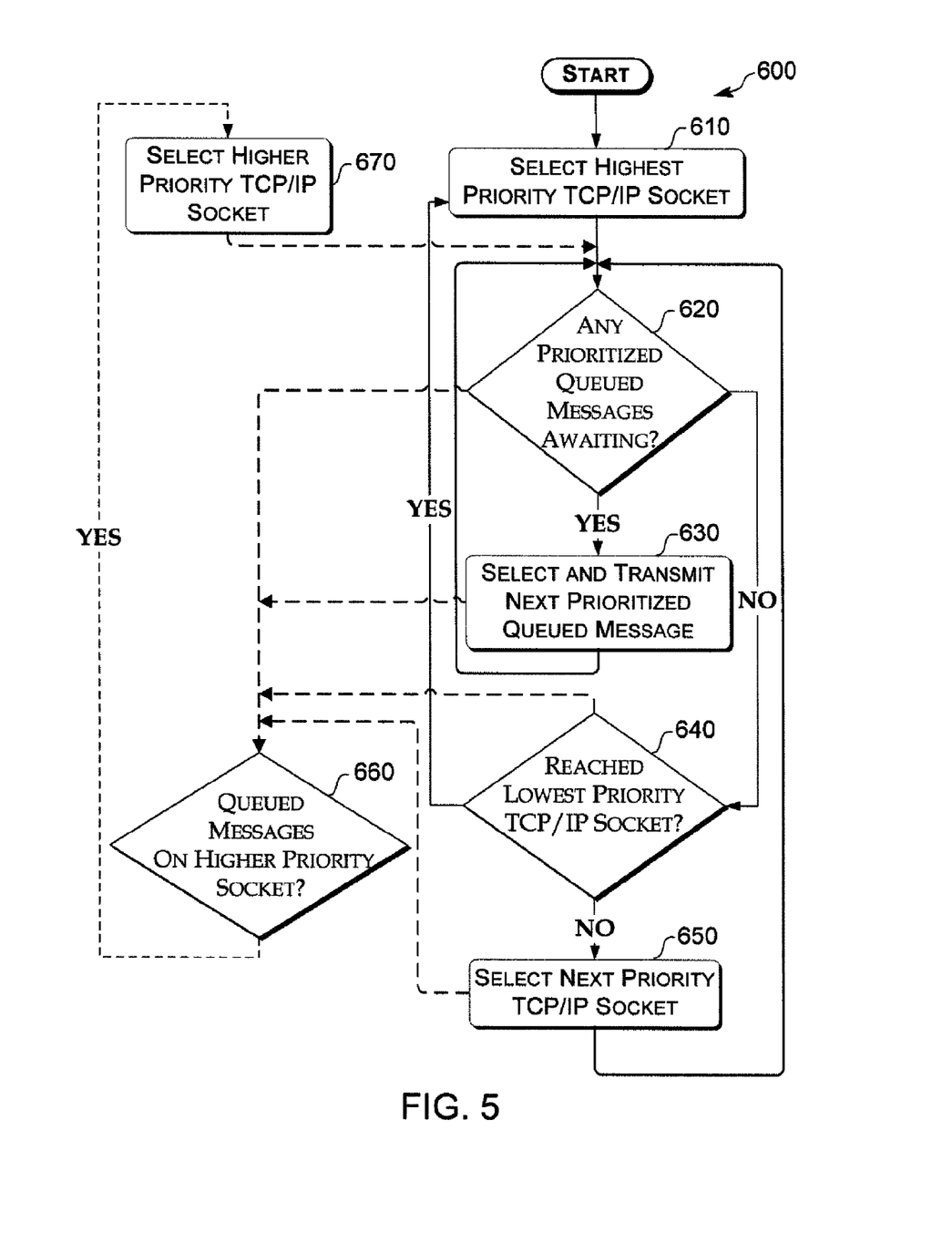
FIG. 5 is a flow chart of at least a portion of the message prioritization process shown in FIG. 3 for sending prioritized messages over a network.

Memory 204 may include volatile storage, non-volatile storage and/or disk storage that may store one or more machine readable and executable instructions, programs and/or data, which when retrieved or read and executed by processor 202, may implement at least a portion of the message prioritization module 210 and/or the message prioritization processes illustrated and described herein in connection with FIGS. 3-5, although some or all of the programmed instructions could be stored and/or executed elsewhere. Moreover, memory 204 may comprise a variety of different types of memory storage devices, such as RAM, ROM, floppy disk storage, hard disk, CD-ROM, DVD ROM, or any other computer readable media, which may be read from and/or written to by a magnetic, optical, or other reading and/or writing system that may be communicatively coupled to processor 202.

The I/O interface 206 may include one or more device and/or peripheral ports that communicatively couple the first management device 200 with one or more other devices, such as first server devices 112 and first client devices 114, and/or peripherals, such as keyboards, mice and display devices (not illustrated), for enabling operators to control the management device 200 for performing configuration operations and the like, for example, although other types and numbers of devices and peripherals could be used for controlling the device to perform a variety of other operations.

The network interface 208 may include one or more host bus adapters ("HBAs") or controllers, such as network cards (e.g., Ethernet and Novell network interface cards), which may communicatively couple the first network management device 200 to the first LAN 110 and the second LAN 120 over the WAN 110, although other types of network HBAs could be used, including Fibre channel, SCSI and/or iSCSI storage networking HBAs, and the like.

It should be noted that one or more of the above-described components in first network management device 200 could be implemented by software, hardware, firmware and combinations thereof. Also, some or all of the machine readable and executable instructions represented by the functional block diagrams and flowcharts depicted in FIGS. 2-5, respective, may be implemented manually. Further, although the example processes are described with reference to the flowcharts illustrated in FIGS. 3 and 5, ordinary skilled persons in the computer, software and networking arts will readily appreciate that many other methods of implementing the example machine readable and executable instructions may alternatively be used. For example, the order of execution of the blocks may be changed, and/or some of the blocks described may be changed, eliminated, or combined.

Referring back specifically to FIG. 1, the second network management device 500 may be identical to the first network management device 200, although the second network management device 500 may include different and/or a fewer or greater number of components.

Referring generally to FIGS. 3-5, portions of a message prioritization process will be described with occasional reference back to FIGS. 1-2. Referring now specifically to FIGS. 3 and 4, the operation of the message prioritization module 210 implemented in at least one of the first and second traffic management devices 200, 500 to perform a first portion of the message prioritization process 500 for prioritizing incoming un-prioritized messages 212 will now be described.

Beginning in step 510, the message prioritization module 210 may obtain one or more incoming un-prioritized messages 212 (i.e., MESSAGE 1, MESSAGE 2) received by the first network management device 200 over an un-prioritized TCP/IP connection 214. The incoming un-prioritized messages 212 may originate from one or more of the first server devices 112 and/or the first client devices 114, and their destination may include one or more of the second server devices 122 and/or second client devices 124 in the second LAN 120 by way of the second network management device 500 and/or the WAN 130.

In step 520, the message prioritization module 210 may store one of the received incoming un-prioritized messages 212, such as MESSAGE 1, in any one of the first and second buffers 306(1), 306(2) that may be free or otherwise have storage capacity within the message buffer pool 304. Accordingly, the message prioritization module 210 may retrieve one of the free first or second buffers 306(1), 306(2) from the message buffer pool 304, and the module 210 may read one of the incoming un-prioritized messages 212 (e.g., MESSAGE 1) into the buffer.

As the message prioritization module 210 receives one or more other incoming un-prioritized messages 212 (e.g., MESSAGE 2), the module 210 may likewise store the messages 212 in an available one of the first and second buffers 306(1), 306(2) maintained in memory 204. If there are no available first and second buffers 306(1), 306(2) within the message buffer pool 304, however, then one or more of the other incoming un-prioritized messages 212 may be dropped.

In step 530, the message prioritization module 210 may classify the un-prioritized messages 212 (e.g., MESSAGE 1, MESSAGE 2) from the first and second buffers 306(1), 306(2) in the message buffer pool 304 in some manner. Examples include prioritizing each of the messages 212 based on one or more factors including characteristics of the messages themselves with respect to each other (e.g., every other message is high priority, etc.), although the messages could be classified based on any number of other factors including network conditions, payload message content, protocol header values or any other Layer-7 characteristic of the network traffic, and the like.

The message prioritization module 210 may specify the classification (e.g., prioritization) information in the data packet headers of each data packet forming each message. In this example, prioritizing the un-prioritized messages 212 may result in first priority messages 216 and second priority messages 218. Whichever method the message prioritization module 210 employs to classify the un-prioritized messages 212, however, the module 210 may simply maintain these message classifications (e.g., prioritizations) in memory 204 for each of the messages 212 in the message buffer pool 304 for subsequent processing as described herein.

Furthermore, the message prioritization module 210 may optionally enhance the classification effects by marking or coloring the Differentiated Services Code Point (DSCP) bits, Terms of Service (ToS) bits, and/or MultiProtocol Label Switching (MPLS) bits in the headers of each data packet forming the classified messages (e.g., first and second priority messages 216, 218), although other coloring methods could be utilized. By coloring the first and second priority messages 216, 218, intermediary network devices in the example message prioritization system environment 100 may be able to make intelligent QoS decisions without requiring Layer-7 processing capabilities.

In step 540, the message prioritization module 210 may queue one of the first priority messages 216 and second priority messages 218 from the message buffer pool 304 onto the appropriate one of the corresponding first and second TCP/IP socket handlers 310, 312, for transmitting over the WAN 130. For instance, MESSAGE 2 may be prioritized as one of the first priority messages 216 and MESSAGE 1 may be prioritized as one of the second priority messages 218, although MESSAGE 1 could instead be prioritized as a first priority message 216 and MESSAGE 2 could be prioritized as a second priority message 218, both MESSAGE 1 and MESSAGE 2 could be prioritized as first priority messages 216, or both MESSAGE 1 and MESSAGE 2 could be prioritized as second priority messages 218.

In this example, the message prioritization module 210 may then instruct the network interface 208 to transmit the first priority messages 216 (e.g., MESSAGE 2) ahead of the second priority messages 218 (e.g., MESSAGE 1) through the first priority TCP/IP connection 217, and the network interface 208 may begin transmitting as described in greater detail below in connection with FIG. 5.

It should be noted, however, that the recipient of the transmitted first or second priority messages 216, 218, which in this example include one or more devices in the second LAN 120 (i.e., second network traffic management device 500, second server devices 122, second client devices 124, and/or applications operating on any of the foregoing), may read the messages 216, 218 from the established first and second priority TCP/IP connections 217, 219, respectively, in the same manner as they would any other messages transmitted over TCP/IP connections. Alternatively, the second traffic management device 500 could be configured to instead read the messages 216, 218 from the first and second priority TCP/IP connections 217, 219, respectively, and then write the messages back to a single TCP connection established with the intended recipient (i.e., second server 122, second client 124, and/or applications operating on any of the foregoing) in such a fashion as to preserve message boundaries.

Referring now specifically to FIG. 5, a second portion of the message prioritization process 600 for transmitting first and second priority messages 216, 218 over WAN 130 will now be described with reference back to FIGS. 1, 2 and 4. It should be noted that this second portion of the message prioritization process 600 may be performed whilst steps 510-540 from the first portion of the message prioritization process 500 are performed, although the first and second portions 500, 600 could be performed sequentially.

Beginning in step 610, the message prioritization module 210 may select one of the priority assigned TCP/IP socket handlers 308 selected to represent the highest priority socket, such the first priority TCP/IP socket handler 310 in this example, although other TCP/IP sockets could instead be initially selected, such as the second priority TCP/IP socket handler 312.

In decision block 620, the message prioritization module 210 determines whether there are one or more prioritized messages queued on the selected one of the priority assigned TCP/IP socket handlers 308 (e.g., first priority TCP/IP socket handler 310) for transmitting onto the WAN 130. If there is at least one queued message remaining on the selected one of the priority assigned TCP/IP socket handlers 380 (e.g., first priority socket 310), then the YES branch is followed to step 630, otherwise if there are no remaining messages queued on the selected socket handlers, the NO branch is followed to step 640.

In step 630, the message prioritization module 210 selects one or more messages queued on the selected one of the priority assigned TCP/IP socket handlers 308 for transmitting over the WAN 130, and transmits them. In this example, the prioritization module 212 may select first priority messages 216 queued on the first priority TCP/IP socket handlers 310 for transmitting over a first priority TCP/IP connection 217 before selecting any other prioritized messages queued on any other socket handlers 308, such as second priority messages 218.

By permitting the priority assigned TCP/IP socket handler 308 having the highest priority with one or more queued messages to transmit its queued messages onto the WAN 130 ahead of the other (e.g., lower) priority socket handlers, high priority messages are expedited over low priority messages without requiring rate shaping of any kind. Furthermore, with each classification or priority corresponding to a TCP connection (e.g., first and second TCP/IP connections 217, 219), intermediary QoS network devices in the example message prioritization system environment 100 may now apply data packet based quality of service techniques to the distinct TCP/IP streams without incurring head of line blocking problems.

In decision block 640, the message prioritization module 210 may determine whether the selected one of the priority assigned TCP/IP socket handlers 308 has the lowest priority among the other sockets. If the selected one of the socket handlers 308 does not have the lowest priority, then the NO branch is followed to step 650, otherwise if the selected socket has the lowest priority, then the YES branch is followed back up to step 610 where the highest priority socket is reselected and steps 620-630 may be repeated as described above.

In step 650, the message prioritization module 210 may select one of the priority assigned TCP/IP socket handlers 308 selected to represent the next lower priority socket, such as the second priority TCP/IP socket handler 312 in this example. Once the next lower priority assigned TCP/IP socket handler 308 is selected, steps 620-630 may be repeated as described above. Thus, higher priority messages may be selected and transmitted before lower priority messages.

In decision block 660, the message prioritization module 210 may determine at any time during steps 620-650, as well as during any of the steps 510-540 from the first portion of the prioritization process 500 described earlier, that there are newly queued messages on another one of the priority assigned TCP/IP socket handlers 308 having a higher priority than the presently selected one of the priority assigned TCP/IP socket handlers 308 (e.g., first and second priority socket handlers 310, 312), as indicated by the dashed lines. If there are newly queued messages on another one of the priority assigned TCP/IP socket handlers 308 having a higher priority than the presently selected one of the priority assigned TCP socket handlers 308, then one of steps 520-540 and/or 620-650 may be interrupted when the determination is made, and the YES branch followed to step 670.

A potential problem or adverse condition may arise from always selecting or at least favoring one or more of the priority assigned TCP/IP socket handlers 308 having queued messages and being assigned a higher or highest priority than a presently selected TCP/IP socket handler 308, however, in that the other lesser priority socket handlers could wind up being "starved" under certain conditions. For instance, if a relatively small number of first priority messages 216 with a higher priority than the second priority messages 218 are consistently queued in the first priority TCP/IP socket handler 310, then the lower priority second priority messages 218 may be substantially less likely to be transmitted.

While such a condition could be desired in some environments, it may create adverse effects in others. Where mitigating these effects is a concern, however, the amount of time that the message prioritization module 210 may dedicate towards transmitting prioritized messages queued on any one or more of the priority assigned socket handlers 308 may be metered out, for example, although a variety of other methods could be employed to prevent any one or more of the sockets 308 from being overly monopolized.

In step 670, the message prioritization module 210 may select the higher priority one of the assigned TCP/IP socket handlers 308 determined to have one or more newly queued messages, and steps 620-650 may be performed in the same manner described above.

In conclusion, the portions of the message prioritization processes 500 and 600 described above, as implemented by the message prioritization module 210 employed in at least one of the network traffic management devices 200, 500 shown in FIG. 1, may have a number of useful practical applications. For example, where at least one of the network traffic management devices 200, 500 employing the message prioritization module 210 also functions to accelerate network traffic, the message prioritization module 210 may be configured to prioritize client issued messages over messages that result from "object pre-fetching" or other predictive techniques. Without such prioritization in this example, prediction-based network traffic might otherwise negatively impact client issued requests whenever the predictions fail. Prioritization in this case might help ensure proper performance even in the event of a miss prediction.

It should be appreciated that some portions of the detailed description have been presented in terms of procedures, steps, logic blocks, processing, and other symbolic representations of operations on data bits that can be performed on computer memory. A procedure, computer/machine executed step, action, logic block, process, etc., are here conceived to be a self-consistent sequence of steps or instructions leading to a desired result. The steps are those utilizing physical manipulations of physical quantities. These quantities can take the form of electrical or magnetic signals capable of being stored, transferred, combined, compared, and otherwise manipulated in a computer and/or processing system. Further, these signals may have been referred to at times as bits, values, elements, symbols, characters, terms, numbers, or the like. Finally, each step may be performed by hardware, software, firmware, or combinations thereof.

Thus, it will be rather apparent to those skilled in the computer, software and networking arts that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of this disclosure. Additionally, the recited order of processing elements or sequences, or the use of numbers, letters, or other designations therefore, is not intended to limit the claimed processes to any order except as may be specified in the claims. Accordingly, the claim scope and coverage is to be limited only by the following claims and equivalents thereto.

What is claimed is:

1. A network traffic prioritization method comprising:
classifying application layer messages obtained by a traffic management device via an incoming TCP/IP connection, the application layer messages being classified to have an assigned priority of transmission to a receiver network device based on one or more criteria independent of any packet-level information in the application layer messages;
assigning one or more application layer messages classified as having a first priority to a first priority socket handler for transmission over a network via a first TCP/IP connection;
assigning one or more application layer messages classified as having a second priority to a second priority socket handler for transmission over the network via a second TCP/IP connection, wherein the second priority application layer messages have a lower transmission priority than the first priority application layer messages; and
transmitting at least a portion of the selected one or more classified first priority application layer messages by the first priority socket handler via the first TCP/IP connection before transmitting at least a portion of the one or more classified second priority application messages by the second priority socket handler via a second TCP/IP connection.

2. The method of claim 1, wherein the transmitting at least a portion of the classified application layer messages further comprises:
preventing the one or more classified second priority application layer messages from being transmitted while the one or more classified first priority application layer messages are transmitted by the first priority socket handle.

3. The method of claim 1, further comprising:
detecting at least one newly received application layer message being classified as a first priority application layer message while the one or more classified second priority application layer messages are being transmitted by the second priority socket handler;
halting transmission of the one or more classified second priority application layer messages; and
transmitting instead one or more classified first priority application layer messages via the first priority socket handler over the first TCP/IP connection.

4. The method of claim 1, wherein the application layer messages include one or more data packets containing a plurality of data packet headers, the method further comprises:
marking at least one of DSCP, ToS and MPLS bits in the data packet headers of to classify the one or more application layer messages to have a desired priority.

5. The method of claim 1, further comprising:
transmitting the one or more classified first priority application layer messages using the first priority socket handler for a finite period of time.

6. The method of claim 1, wherein the classifying application layer messages further comprises:
prioritizing client issued application layer messages over application layer messages generated using predictive techniques.

7. A network traffic management system comprising:
a prioritization module configured to classify application layer messages received over an incoming TCP/IP connection to have an assigned transmission priority based on one or more criteria independent of any packet-level information in the application layer messages;
the prioritization module configured to assign one or more classified application layer messages having a first priority to a first priority socket handler over a network using a first TCP/IP connection; and
the prioritization module configured to assign one or more classified application layer messages having a second priority to a second priority socket handler configured to transmit the one or more second priority application layer messages over the network using a second TCP/IP connection, wherein the one or more first priority application layer messages are transmitted by the first priority socket handler before the one or more second priority application layer messages are transmitted by the second priority socket handler.

8. The system of claim 7, wherein
the prioritization module is configured to prevent the one or more classified second priority application layer messages from being transmitted via the second priority socket handler while the one or more classified first priority application layer messages are transmitted via the first priority socket handler.

9. The system of claim 7, further comprising:
the prioritization module configured to detect one or more newly received application layer messages classified as having a first priority the one or more classified second priority application layer messages are being transmitted by the second priority socket handler;
the prioritization module configured to instruct the second priority socket handler to halt transmission of the one or more classified second priority application layer messages; and
the prioritization module configured to instruct the first priority socket handler to instead transmit the one or more newly received classified first priority application layer messages via the first priority socket handler.

10. The system of claim 7, wherein the application layer messages include one or more data packets containing a plurality of data packet headers, the system further comprising:
the prioritization module that is configured to mark at least one of DSCP, ToS and MPLS bits in the data packet headers of each data packet to classify the one or more application layer messages to have a desired priority.

11. The system of claim 7, further comprising:
the prioritization module configured to transmit the one or more classified first priority application layer messages through the first priority socket handler for a predetermined amount of time.

12. The system of claim 7, further comprising:
the prioritization module that prioritizes client issued application layer messages over application layer messages generated using predictive techniques.

13. A network traffic management apparatus comprising:
a network interface that is configured to receive un-prioritized application level messages through an incoming TCP/IP connection;
a memory that is configured to store one or more machine readable and executable instructions;
a processor that is configured to read and execute the one or more stored machine readable and executable instructions to implement a message classification module, which:
classifies the un-prioritized application level messages into one or more classified application layer messages having a first priority and one or more classified application layer messages having a second priority, the application layer messages being classified based on one or more criteria independent of any packet-level information in the un-prioritized application level messages, selects a first priority socket handler of the network interface to transmit the one or more classified first priority application layer messages over a network via a first TCP/IP connection;

selects a second priority socket handler to transmit the one or more classified second priority application layer messages over a second TCP/IP connection; and the first priority socket handler configured to transmit the one or more classified first priority application layer messages over the network using the first TCP/IP connection before the second priority socket handler transmits the one or more classified second priority application layer messages over the network using the second TCP/IP connection.

14. The apparatus of claim 13, wherein the processor is further configured to:

instruct the second priority socket handler of the network interface to refrain from transmitting the one or more classified second priority application layer messages while the first priority socket handler transmits the one or more classified first priority application layer messages.

15. The apparatus of claim 13, wherein the processor is further configured to:

detect at least one newly received application layer message classified as having a first priority more while the one or more classified second priority application layer messages are being transmitted by the second priority socket handler of the network interface;

instruct the second priority socket handler of the network interface to halt transmission of the one or more classified second priority application layer messages; and instruct the first priority socket handler of the network interface to instead transmit the one or more newly received classified first priority application layer messages over the first TCP/IP connection.

16. The apparatus of claim 13, wherein the application layer messages include one or more data packets containing a plurality of data packet headers, the processor is further configured to:

mark at least one of DSCP, ToS and MPLS bits in the data packet headers of each data packet to classify the one or more application layer messages to have a desired priority.

17. A non-transitory machine-readable storage medium having machine-executable instructions stored thereon, which when executed by at least one processor, causes the at least one processor to perform one or more actions comprising:

classifying application layer messages obtained by a traffic management device an incoming TCP/IP connection, the application layer messages being classified as having a first priority of transmission to a receiver network device based on one or more criteria independent of any packet-level information in the application layer messages;

assigning one or more classified first priority application layer messages to a first priority socket handler for transmission over a network via a first TCP/IP connection;

assigning one or more classified second priority application layer messages to a second priority socket handler for transmission over the network via a second TCP/IP connection, wherein the second priority application layer messages have a lower transmission priority than the first priority application layer messages; and transmitting at least a portion of the selected one or more classified first priority application layer messages by the first priority network socket handler via the first TCP/IP connection before transmitting at least a portion of the one or more classified second priority application messages by the second priority network socket handler via the second TCP/IP connection.

18. The non-transitory machine-readable storage medium of claim 17, further comprising machine-executable instructions that when executed causes the at least one processor to:

instruct the second priority socket handler of the network interface to refrain from transmitting the one or more classified second priority application layer messages over the second TCP/IP connection while the one or more classified first priority application layer messages are transmitted by the first priority socket handler of the network interface over the first TCP/IP connection.

19. The non-transitory machine-readable storage medium of claim 17, further comprising machine-executable instructions that when executed causes the at least one processor to:

detect at least one newly received application layer message classified as having a first priority while the one or more classified second priority application layer messages are being transmitted by the second priority socket handler of the network interface;

instruct the second priority socket handler of the network interface to halt transmission of the one or more classified second priority application layer messages; and instruct the first priority socket handler of the network interface to instead transmit the one or more newly received classified first priority application layer messages over the first TCP/IP connection.

20. The non-transitory machine-readable storage medium of claim 17, wherein the application layer messages include one or more data packets containing a plurality of data packet headers, the medium further comprising machine-executable instructions that when executed causes the at least one processor to:

mark at least one of DSCP, ToS and MPLS bits in the data packet headers of each data packet to classify the one or more application layer messages to have a desired priority.

21. A method comprising:

receiving one or more application layer messages, to be forwarded to at least one first network device, at a traffic management device through an incoming TCP/IP connection;

identifying at least some received application layer messages as first priority messages and at least some other received application layer messages as second priority messages based on one or more criteria independent of any packet-level information in the one or more received application layer messages;

selecting a first priority socket handler to transmit one or more identified first priority application layer messages;

selecting a second priority socket handler to transmit one or more identified second priority application layer messages, wherein the one or more identified first priority application layer messages have a higher priority over the one or more identified second priority application layer messages to be transmitted over a network when both types of application layer messages are otherwise available and ready for transmission from the traffic management device; and transmitting the selected first priority application layer messages over the network to the at least one first network device by the first priority socket handler using one or more outgoing TCP/IP connections.

* * * * *